US012459355B2

(12) United States Patent
Nakamura et al.

(10) Patent No.: US 12,459,355 B2
(45) Date of Patent: Nov. 4, 2025

(54) DRIVER SUPPORT SYSTEM, DRIVER SUPPORT METHOD, AND STORAGE MEDIUM

(71) Applicant: HONDA MOTOR CO., LTD., Tokyo (JP)

(72) Inventors: Keisuke Nakamura, Wako (JP); Satoru Shinkawa, Wako (JP); Tomohiro Imai, Wako (JP); Shigenobu Mitsuzawa, Wako (JP); Hideki Sakai, Wako (JP); Hiroshi Ono, Wako (JP); Masahiro Kimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 18/460,211

(22) Filed: Sep. 1, 2023

(65) Prior Publication Data

US 2024/0083245 A1    Mar. 14, 2024

(30) Foreign Application Priority Data

Sep. 14, 2022 (JP) .................. 2022-146525

(51) Int. Cl.
*B60K 28/06* (2006.01)
*A61B 5/00* (2006.01)

(52) U.S. Cl.
CPC ............ *B60K 28/06* (2013.01); *A61B 5/4803* (2013.01)

(58) Field of Classification Search
CPC ........ A61B 5/18; A61B 5/4803; B60K 28/06; B60W 40/09; B60W 40/08; B60W 50/14
See application file for complete search history.

(56) References Cited

U.S. PATENT DOCUMENTS

2014/0276090 A1* 9/2014 Breed .................. A61B 5/1455
600/473
2021/0113093 A1   4/2021 Nozawa et al.

FOREIGN PATENT DOCUMENTS

JP    2008-130066 A    6/2008
JP    2018-195249 A    12/2018
JP    2019-127238 A    8/2019
(Continued)

OTHER PUBLICATIONS

Japanese Office Action dated Jul. 22, 2025 issued in corresponding Japanese application No. 2022-146525; English machine translation included (9 pages).

*Primary Examiner* — Benyam Haile
(74) *Attorney, Agent, or Firm* — Rankin, Hill & Clark LLP

(57) ABSTRACT

A driver support system includes: an acquisition unit that acquires biometric data of a driver of a moving object; an evaluation unit that evaluates a health condition of the driver; and an interactive response unit that executes an interaction operation for interactive response with the driver using an HMI device mounted on the moving object, the evaluation unit being configured to; when estimating based on the biometric data for the driver that the health condition of the driver is poor, instruct the interactive response unit to execute the interaction operation, thereby acquiring a response input, which is a response of the driver to a response facilitating output that facilitates the driver to respond in the interaction operation; and determine the health condition of the driver based on a degree of suitability of the response input to the response facilitating output.

9 Claims, 5 Drawing Sheets

(56) References Cited

FOREIGN PATENT DOCUMENTS

| | | | |
|---|---|---|---|
| JP | 2020-177577 A | 10/2020 | |
| JP | 2021-133842 A | 9/2021 | |
| JP | 2022-008806 A | 1/2022 | |
| WO | WO-2013023032 A1 * | 2/2013 | ............. B60K 28/06 |

* cited by examiner

DRIVER SUPPORT SYSTEM, DRIVER SUPPORT METHOD, AND STORAGE MEDIUM

INCORPORATION BY REFERENCE

The present application claims priority under 35 U.S.C. § 119 to Japanese Patent Application No. 2022-146525 filed on Sep. 14, 2022. The content of the application is incorporated herein by reference in its entirety.

BACKGROUND OF THE INVENTION

Field of the Invention

The present invention relates to a driver support system, a driver support method, and a storage medium.

Description of the Related Art

A mobile wireless device system is disclosed in Japanese Patent Laid-Open No. 2008-130066 in which an exhalation detection unit is provided in a voice microphone of a mobile wireless device to record exhalation data for a driver of a moving object, whereby a condition of the driver can be grasped based on the recorded exhalation data.

During diagnosis of a health condition of a person, there may be a case where appropriate diagnosis cannot be performed based only on changes in occurring exhalation of the person.

An object of the present invention is to appropriately determine a health condition of a driver of a moving object and to provide the driver with appropriate support for safe driving.

SUMMARY OF THE INVENTION

A first aspect of the present invention provides a driver support system including: an acquisition unit that acquires biometric data of a driver of a moving object; an evaluation unit that evaluates a health condition of the driver; and an interactive response unit that executes an interaction operation for interactive response with the driver using an HMI device mounted on the moving object, the evaluation unit being configured to: when estimating based on the biometric data for the driver that the health condition of the driver is poor, instruct the interactive response unit to execute the interaction operation, thereby acquiring a response input, which is a response of the driver to a response facilitating output that facilitates the driver to respond in the interaction operation; and determine the health condition of the driver based on a degree of suitability of the response input to the response facilitating output.

In the driver support system according to the first aspect of the invention, the driver support system includes a setting unit that performs an operation setting of the moving object, and the setting unit prohibits the moving object from moving when the interactive response unit does not receive the response input in the interaction operation.

In the driver support system according to the first aspect of the invention, the interactive response unit repeatedly executes the response facilitating output at predetermined time intervals when not receiving the response input to the response facilitating output from the driver.

In the driver support system according to the first aspect of the invention, the driver support system includes a recording unit that records a result of the health condition of the driver evaluated by the evaluation unit, and when the evaluation unit estimates based on the biometric data that the health condition of the driver is poor and then determines based on the degree of suitability that the health condition of the driver is good, the recording unit causes a storage device to store the biometric data and a result of the determination in association with each other.

In the driver support system according to the first aspect of the invention, the driver support system includes a setting unit that performs an operation setting of the moving object, the setting unit applies a predetermined first setting to the operation setting of the moving object when the evaluation unit determines based on the biometric data that the health condition of the driver is good, and the setting unit applies a predetermined second setting different from the first setting to the operation setting of the moving object when the evaluation unit determines based on the biometric data that the health condition of the driver is poor and then determines based on the degree of suitability that the health condition of the driver is good.

In the driver support system according to the first aspect of the invention, the response facilitating output facilitates the driver to respond in voice, the response input being a voice response from the driver to the response facilitating output, the interactive response unit executes the interaction operation using an open-ended question as the response facilitating output, and the evaluation unit performs an evaluation on the presence or absence of a symptom of speech disorder or delirium in the driver or a degree of the symptom, based on a voice response, which is the response input in the interaction operation, and determines the health condition of the driver based on a result of the evaluation.

In the driver support system according to the first aspect of the invention, the response facilitating output is output to the driver through a speaker and/or a display device mounted on the moving object, and the response input is received through a microphone and/or a touch panel mounted on the moving object.

A second aspect of the present invention provides a driver support method executed by a computer, the driver support method including: an acquisition step of acquiring biometric data of a driver of a moving object; an evaluation step of evaluating a health condition of the driver; and an interactive response step of executing an interaction operation for interactive response with the driver in the moving object, the evaluation step including: when estimating based on the biometric data for the driver that the health condition of the driver is poor, causing the interactive response step to be executed, thereby executing the interaction operation using an HMI device mounted on the moving object, and acquiring a response input, which is a response of the driver to a response facilitating output that facilitates the driver to respond in the interaction operation; and determining the health condition of the driver based on a degree suitability of the response input to the response facilitating output.

A third aspect of the present invention provides a non-transitory computer readable storage medium storing a driver support program causing a computer of a driver support system to function as: an acquisition unit that acquires biometric data of a driver of a moving object; an evaluation unit that evaluates a health condition of the driver; and an interactive response unit that executes an interaction operation for interactive response with the driver in the moving object, the evaluation unit being configured to: when estimating based on the biometric data for the driver that the health condition of the driver is poor, instruct the interactive response unit to execute the interaction operation using an HMI device mounted on the moving object, thereby acquiring a response input, which is a response of the driver to a response facilitating output that facilitates the driver to respond in the interaction operation; and determine the health condition of the driver based on a degree suitability of the response input to the response facilitating output.

According to the aspects of the present invention, it is possible to appropriately determine the health condition of the driver of the moving object and to provide the driver with appropriate support for safe driving.

DETAILED DESCRIPTION OF THE PREFERRED EMBODIMENT

Embodiment

An embodiment of the present invention will be described below with reference to the drawings.

Figure 1:
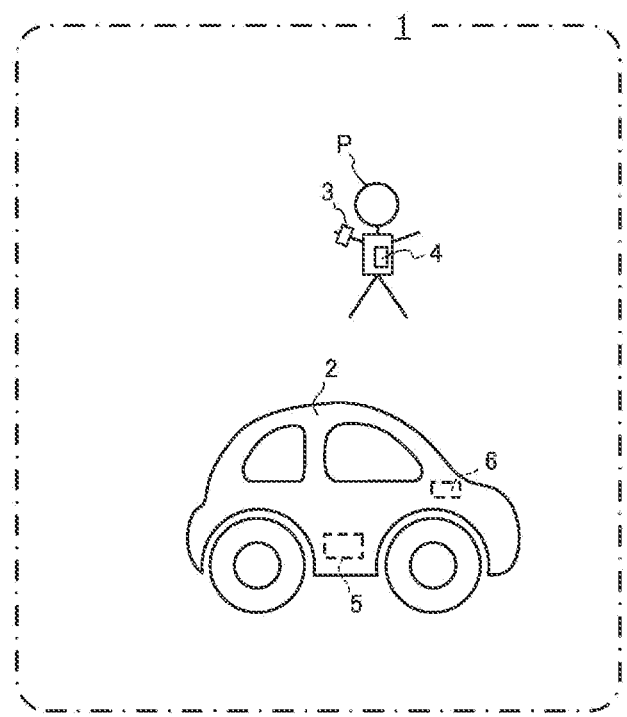
FIG. 1 is a diagram showing a configuration of a driver support system according to an embodiment of the present invention.

FIG. 1 is a diagram for explaining a configuration of a driver support system 1 according to an embodiment of the present invention together with an example of its use scene. When a driver P gets in a vehicle 2, which is a moving object, the driver support system 1 evaluates health condition of the driver P.

The driver support system 1 includes a wearable terminal 3 and a mobile terminal 4 used by the driver P, and a support device 5 mounted on the vehicle 2 driven by the driver P. By short-range communication such as Bluetooth (registered trademark), the wearable terminal 3 and the mobile terminal 4 are communicably connected to each other, and the mobile terminal 4 and the support device 5 are communicably connected to each other. The vehicle 2 also includes a vehicle control device 6 that realizes an ADAS (Advanced Driver-Assistance System) function such as a front vehicle follow-up traveling function or an automatic braking function. In the present disclosure, the vehicle control device 6 is an example of an in-vehicle device (computer) that causes the driver support system 1 to set the operation of the vehicle 2.

The mobile terminal 4 is, for example, a smartphone, and includes a camera, an acceleration sensor, and/or a GNSS (Global Navigation Satellite System) sensor. The wearable terminal 3 is, for example, a wristwatch terminal device, and includes various sensors of a pulse wave sensor, a heart rate sensor, a blood pressure sensor, acceleration sensor, and/or a GNSS sensor, for example, according to the related art, thereby measuring biometric data of the driver P and transmitting the measured biometric data to the mobile terminal 4.

Figure 2:
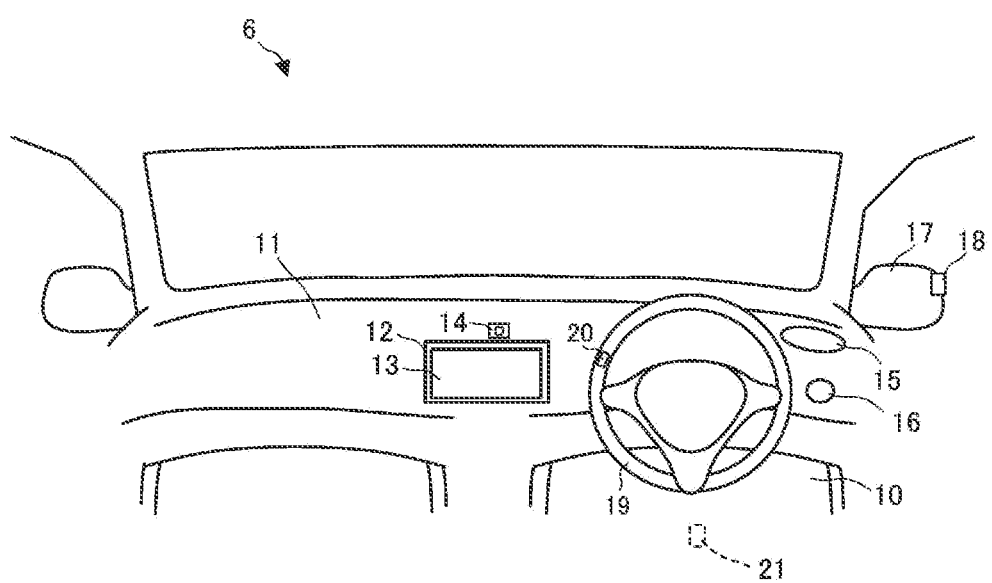
FIG. 2 is a view showing an example of a configuration of a vehicle equipped with a support device constituting the driver support system, as viewed from a vehicle interior.

FIG. 2 is a view showing an example of a configuration of the vehicle 2 as viewed from a vehicle interior. An instrument panel 11 in front of a driver's seat 10 is provided with AV (Audio-Visual) device 12 and an interior camera 14 which are arranged approximately in a center in a vehicle width direction. The AV device 12 is, for example, a display/audio device, and displays images and videos (hereinafter, simply referred to as images) on a first touch panel 13 and acquires information input by a touch operation on the first touch panel 13. In addition, the AV device 12 outputs a voice and receives a voice input from a speaker 15 and a microphone 16 provided closer to the driver's seat on the instrument panel 11. Here, a display screen of the first touch panel 13 corresponds to a display device in the present disclosure.

In addition, the interior camera 14 is, for example, a DMC (Driver Monitoring Camera), and captures an image of the vehicle interior including an image of the driver. Here, the first touch panel 13, the speaker 15, and the microphone 16 correspond to an HMI device in the present disclosure.

Further, the vehicle 2 includes an exterior camera 18 provided in a door mirror 17 on a side closer to the driver's seat 10. The exterior camera 18 captures an image of a surrounding environment outside the right side of the vehicle 2. For example, the exterior camera 18 captures an image of a person approaching a vehicle door (not shown) on the driver's seat 10 from the right outside of the vehicle 2. The exterior camera 18 is not limited to one, and may be configured by a plurality of cameras distributed over the body of the vehicle 2 to capture a whole or part of the surrounding environment of the vehicle 2.

The driver's seat 10 is provided with a seating sensor 21 that detects seating of a person. The seating sensor 21 is, for example, a pressure-sensitive sensor that detects a pressure applied to a seat by the weight of a seated person. The vehicle 2 may also be provided with a heart rate sensor 20 on the steering wheel 19.

The mobile terminal 4 acquires biometric data of the driver P from the wearable terminal 3 worn by the driver P, for example. Then, for example, when the driver P is seated on the driver's seat 10 of the vehicle 2, the mobile terminal 4 estimates a health condition of the driver P based on the acquired biometric data.

Subsequently, when estimating based on the biometric data that the health condition of the driver P is poor, the mobile terminal 4 executes an interaction operation for interactive response with the driver P using the HMI device mounted on the vehicle 2. In the interaction operation, the mobile terminal 4 outputs a response facilitating output for response facilitation to the driver P from the HMI device, and acquires a response input, which is a response of the driver P to the response facilitating output, via the HMI device. Then, the mobile terminal 4 evaluates a degree of suitability of the response input of the driver P to the response facilitating output, and determines the health condition of the driver P based on the suitability. Thus, the health condition of the driver P of the vehicle 2 can be appropriately determined, including a viewpoint of possibility of brain disease, and appropriate support for safe driving can be provided to the driver P.

The response facilitating output is preferably an voice output from the speaker 15.

For example, the response facilitating output may facilitate the driver P to respond in voice. For example, the response facilitating output may be an open-ended question, which sets no limits on the scope of response contents, such as "Where are you going today?" or "What shall we do about the air conditioner?". By acquiring the voice of the driver P as a response input from the driver P with respect to such a question, the mobile terminal 4 can evaluate, as an evaluation of the suitability of the response input, whether the driver P has a symptom of speech disorder or delirium as a prediction or a sign of a brain disorder, or the degree of the symptom. Here, the speech disorder may include dysarthria (disorder that words are not pronounced well) and aphasia (speech disorder).

Alternatively, the response facilitating output may be to present a question of cognitive test. Such a response facilitating output may be configured by a question output of a cognitive test performed by displaying text or graphics on the screen of the first touch panel 13, and an operation instruction such as "Please touch lighted icons quickly". A response input from the driver P with respect to the question may be, for example, various operations performed by touching the first touch panel 13 with a finger.

Upon not receiving the response input from the driver P with respect to the response facilitating output, the mobile terminal 4 may repeatedly execute the response facilitating output at predetermined time intervals. Thus, even when the driver P is engrossed by other things and thus not able to input a response, the health condition is not determined to be poor, and the health condition of the driver P can be evaluated more appropriately.

In addition, upon not receiving the response input from the driver P in the interaction operation described above, the mobile terminal 4 prohibits the vehicle 2 from moving. Thus, when it can be determined that the driver P has no response input and there is a possibility that the driver P has a brain disease, the vehicle 2 is prohibited from being moved, and dangerous driving can be prevented beforehand that may occur due to the health condition.

When it is estimated based on the biometric data acquired from the wearable terminal 3 that the health condition of the driver P is poor and then is determined based on the degree of suitability of the response input of the driver P in the interaction operation that the health condition of the driver P is "good", the mobile terminal 4 causes the storage device to store the biometric data and a result of the determination of "good" in association with each other. Thus, it is possible to improve estimation accuracy of the health condition based on the biometric data, using the correspondence information between the biometric data and the determination result stored in the storage.

When it is estimated based on the biometric data that the health condition of the driver P is good, the mobile terminal 4 instructs the support device 5 to apply a predetermined first setting to the operation setting of the vehicle control device 6 of the vehicle 2. On the other hand, when it is estimated based on the biometric data that the health condition of the driver P is poor and then is determined based on the degree of suitability of the response input from the driver P in the interaction operation that the health condition of the driver P is good, the mobile terminal 4 instructs the support device 5 to apply a predetermined second setting different from the first setting to the operation setting of the vehicle control device 6 of the vehicle 2. Here, the second setting may be, for example, a safety setting with more safety considerations than the first setting. When the biometric data is not good but the response input is normal, since it is considered that the driver P is in a state of fatigue or lack of sleep, appropriate support for safe driving can be provided to the driver P by switching the operation setting of the vehicle 2 as described above.

Specifically, for example, the mobile terminal 4 cooperates with the support device 5 to set the inter-vehicle distance in the front vehicle follow-up traveling, which is part of the ADAS function of the vehicle control device 6, to be longer in the second setting rather than the first setting. Alternatively, the mobile terminal 4 cooperates with the support device 5 to set the start condition of the automatic braking, which is part of the ADAS function of the vehicle control device 6, to be decelerated earlier in the second setting rather than the first setting.

Configurations of the mobile terminal 4 and the support device 5 will be described below.

Figure 3:
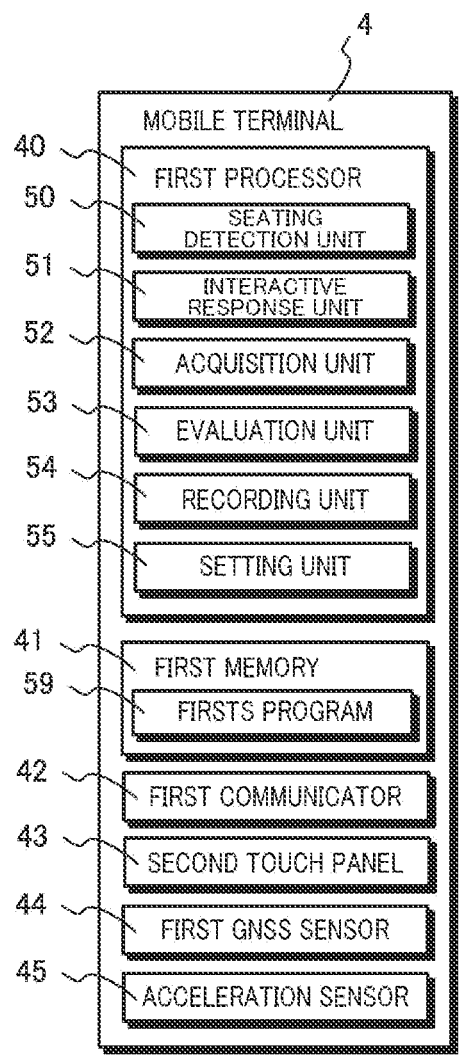
FIG. 3 is a diagram showing a configuration of a mobile terminal constituting the driver support system.

FIG. 3 is a diagram showing a configuration of the mobile terminal 4 constituting the driver support system 1.

The mobile terminal 4 is, for example, a smartphone. The mobile terminal 4 includes a first processor 40, a first memory 41, a first communicator 42, a second touch panel 43, a first GNSS sensor 44, and an acceleration sensor 45. The acceleration sensor 45 is, for example, a 9-axis acceleration sensor.

The first memory 41 may be configured by volatile and/or non-volatile semiconductor memory. The first communicator 42 is a transceiver (transmitter/receiver, circuit) through which the mobile terminal 4 communicates with the wearable terminal 3 and the support device 5. For example, the first communicator 42 can include a short-range communicator for performing short-range communication conforming to a Bluetooth (registered trademark) communication standard between the wearable terminal 3 and the support device 5 of the vehicle 2. The first communicator 42 can include a long-range communicator for performing communication via a communication network such as the Internet.

The first processor 40 is a computer including a CPU (Central Processing Unit), for example. The first processor 40 may include a ROM (Read Only Memory) in which a program is written, a RAM (Random Access Memory) for temporarily storing data, and the like. Then, the first processor 40 includes a seating detection unit 50, an interactive response unit 51, an acquisition unit 52, an evaluation unit 53, a recording unit 54, and a setting unit 55, as functional components or functional units.

These functional components of the first processor 40 are implemented when the first processor 40 serving as a computer executes a first program 59 stored in the first memory 41. The first program 59 can be stored in any computer-readable storage medium. Alternatively, all or some of the functional components of the first processor 40 may be configured by hardware including one or more electronic circuit components. Here, the first program 59 constitutes a driver support system in the present disclosure together with a second program 79 executed by the support device 5.

The arrival detection unit 50 detects that the driver P is seated on the driver's seat 10 of the vehicle 2. Specifically, the seating detection unit 50 acquires, from the support device 5, seating information as to whether a person is seated on the driver's seat 10 through Bluetooth communication with the support device 5 via the first communicator 42, and thus detects that the driver P is seated on the driver's seat 10.

For example, first, the seating detection unit 50 determines, based on a distance between the mobile terminal 4 and the vehicle 2 measured from the received radio field intensity of the Bluetooth communication, whether the mobile terminal 4 approaches closer the vehicle 2. More specifically, for example, the seating detection unit 50 determines whether the mobile terminal 4 is within a predetermined distance range (for example, within 1 m) from the vehicle 2. Then, when the mobile terminal 4 is within the predetermined distance range from the vehicle 2, the seating detection unit 50 repeatedly acquires the seating information from the support device 5, and determines that the driver P is seated on the driver's seat 10 when receiving the seating information indicating that a person is seated on the driver's seat 10.

Instead of the above, when the Bluetooth communication with the support device 5 of the vehicle 2 is established, the seating detection unit 50 may acquire an image of the interior of the vehicle 2 captured by the interior camera 14 of the vehicle 2, and determine based on the acquired image of the interior that the driver P is seated on the driver's seat 10.

The interactive response unit 51 executes the interaction operation for interactive response with the driver P using the HMI device mounted on the vehicle 2. The interactive response unit 51 executes the interaction operation using the HMI device mounted on the vehicle 2 according to instructions from the evaluation unit 53, which will be described below. In the interaction operation, the interactive response unit 51 performs a response facilitating output for response facilitation to the driver P, and acquires a response input, which is a response from the driver P to the response facilitating output.

As described above, the response facilitating output can be performed by the speaker 15 or the first touch panel 13, which is a display device. However, from the viewpoint of increasing receptivity of the response facilitating output to the driver p, the response facilitating output is preferably a voice output from the speaker 15.

Further, the response input from the driver P is received by the microphone 16 and/or the first touch panel 13 mounted on the vehicle 2.

The response facilitating output may facilitate the driver P to respond in voice by question and answer. Further, the response input may be a voice response from the driver P.

For example, the response facilitating output may be an open-ended question, which sets no limits on the scope of response contents (for example, where a simple "yes" or "no" response alone will not be an appropriate response), such as "Where are you going today?" or "What shall we do about the air conditioner?". For example, the interactive response unit 51 selects one scenario from a plurality of predetermined question-answer scenarios according to an instruction from the evaluation unit 53, and outputs one or a plurality of open-ended questions to the driver P according to the selected scenario. A standard sequence of questions and responses can be defined in each of the scenarios in such a form in which an open-ended question is defined for each of a plurality of responses assumed to one open-ended question.

The interactive response unit 51 acquires a speech of the driver P as a response input from the driver P to each open-ended question as a response facilitating output, using the microphone 16.

Alternatively, the response facilitating output may present the question of cognitive test as described above. For example, the interactive response unit 51 selects one cognitive test from a plurality of predefined cognitive tests according to an instruction from the evaluation unit 53, and outputs a series of tasks of the selected cognitive test through the screen of the first touch panel 13. The cognitive test may be a reaction time test for touching a plurality of icons displayed on the screen of the first touch panel 13 according to specific conditions, or a Trail Making Test for tracing the plurality icons with a finger in order according to specific conditions.

As described above, the response facilitating output, which presents the question of the cognitive test, may be configured by the question output of the cognitive test performed by displaying text or graphics on the screen of the first touch panel 13, and the operation instruction such as "Please touch lighted icons quickly". The interactive response unit 51 can perform the response facilitating output as described above after outputting a voice, such as "Please take a simple test before driving", for introduction to the cognitive test.

The response input from the driver P to the response facilitating output constituted by the cognitive test questions may be, for example, various operations (for example, touching, swiping, tapping, and flicking) performed by touching the first touch panel 13 with a finger.

The interactive response unit 51 uses the first touch panel 13 to acquire the response inputs (for example, including a response time from questioning to touch, a time required for response operation such as tracing, and information about accuracy thereof) from the driver P to individual questions of the cognitive test.

Further, upon not receiving the response input from the driver P to the response facilitating output, the interactive response unit 51 repeatedly executes the response facilitating output at predetermined time intervals. Thus, even when the driver P is engrossed by other things and thus not able to input a response, the health condition is not determined to be poor, and the health condition of the driver P can be evaluated more appropriately.

The acquisition unit 52 acquires biometric data of the driver P of the vehicle 2. In the present embodiment, the acquisition unit 52 acquires biometric data (pulse wave, heart rate, blood pressure, and like) of the driver P from the wearable terminal 3 worn by the driver P. However, the wearable terminal 3 is an example, and the acquisition unit 52 can acquire biometric data of the driver P from various devices capable of measuring biometric data.

For example, the acquisition unit 52 can acquire biometric data (for example, blood pressure) of the driver P from an image of surroundings of the vehicle 2 captured by the exterior camera 18 and a facial image of the driver P reflected in the image of the interior captured by the interior camera 14 according to the related art (for example, see Japanese Patent Laid-Open No. 2022-008806). Alternately, the acquisition unit 52 may acquire a heart rate, which is biometric data of the driver, using heart rate sensor 20 when the driver P grips the steering wheel 19.

The acquisition unit 52 can acquire the images captured by the exterior camera 18 and the interior camera 14 and sensor signals of the heart rate sensor 20 from the support device 5 when the first communicator 42 establishes Bluetooth communication with the support device 5. Further, the acquisition unit 52 can extract the image of the driver P from the surrounding image or the interior image using facial image recognition processing according to the related art, and can acquire a blood pressure value of the driver P.

The evaluation unit 53 evaluates the health condition of the driver P. In the present embodiment, particularly, the evaluation unit 53 estimates the health condition of the driver P, based on the biometric data of the driver P acquired by the acquisition unit 52, when the seating detection unit 50 detects that the driver P is seated on the driver's seat 10, for example. In addition, upon estimating based on the biometric data that the health condition of the driver P is poor, the evaluation unit 53 instructs the interactive response unit 51 to execute the interaction operation, and acquires the response input of the driver P to the response facilitating output. Then, the evaluation unit 53 determines the health condition of the driver P based on the degree of suitability of the acquired response input to the response facilitating output.

For example, the evaluation unit 53 instructs the interactive response unit 51 to perform the above-described interaction operation in the question-answer format, and evaluates the presence or absence of the symptom of speech disorder or delirium in the driver P or the degree of the symptom, based on the voice response, which is the response input from the driver P acquired by the interactive response unit 51. Then, the evaluation unit 53 determines the health condition of the driver P based on the result of the evaluation for the symptom of the speech disorder. Thus, a prediction or a sign of a brain disease in the driver P can be detected, and the health condition of the driver P can be appropriately determined.

Here, the symptom of the speech disorder may include, for example, dysarthria (disorder that words are not pronounced well) and aphasia (speech disorder). Further, the symptom of delirium can also include, for example, disorientation, memory disorder, and/or emotion or mood disorder.

The evaluation unit 53 evaluates clarity of pronunciation (rhythm), delay in speech (word finding difficulty), disturbance in pronunciation (fluency disorder), speech errors (phonemic paraphasia or verbal paraphasia), and the like with respect to the voice input of the driver P acquired as the response input, thereby evaluating the presence or absence of the symptom of speech disorder or the degree of the symptom, and evaluating the degree of suitability of the response input. In addition, the evaluation unit 53 evaluates recognition errors of time and place (disorientation, memory disorder), changes in tone (emotion or mood disorder), and the like with respect to the voice input of the driver P acquired as the response input, thereby evaluating the presence or absence of the symptom of delirium or the degree of the symptom, and evaluating the degree of suitability of the response input.

The results of these evaluations are expressed, for example, by a score representing the degree of suitable symptoms, and as the score becomes higher, the suitability of the response input can be determined to be lower. For example, the evaluation unit 53 can determine that the health condition of the driver P is poor when the score exceeds a predetermined threshold value, and determine that the health condition of the driver P is good when the score is equal to or lower than the threshold value.

Alternatively, the evaluation unit 53 instructs the interactive response unit 51 to perform the interaction operation in the cognitive test format described above, and evaluates the presence or absence of dementia tendency or the degree of dementia tendency in the driver P, based on the response input from the driver P acquired by the interactive response unit 51 through first touch panel 13. Then, the evaluation unit 53 determines, based on the result of the evaluation of the dementia tendency, the health condition of the driver P. Thus, as in the interaction operation in the question-answer format, a prediction or a sign of a brain disease in the driver P can be detected, and the health condition of the driver P can be appropriately determined.

The result of the evaluation in the interaction operation in the cognitive test format is expressed by, for example, a score representing a correct answer rate in the cognitive test, and as the score becomes higher, the suitability of the response input can be determined to be higher. For example, the evaluation unit 53 can determine that the health condition of the driver P is good when the score exceeds a predetermined threshold value, and determine that the health condition of the driver P is poor when the score is equal to or lower than the threshold value.

The recording unit 54 records the results of the health condition of the driver P evaluated by the evaluation unit 53. In the present embodiment, particularly, after the evaluation unit 53 estimates based on the biometric data of the driver P that the health condition of the driver P is poor, upon determining based on the degree of suitability of the response input from the driver P in the interaction operation that the health condition of the driver P is "good", the recording unit 54 causes the storage device to store correspondence information in which the biometric data is associated with the determination result of "good". Thus, when estimating the health condition of the driver P based on the biometric data, the evaluation unit 53 refers to the correspondence information stored in the storage device, thereby improving the estimation accuracy of the health condition. Further, for example, when the evaluation unit 53 is configured by a machine learning model in which machine learning is performed on the relationship between the biometric data and the health condition, the correspondence information is used as training data, and thus it is possible to improve the estimation accuracy of the health condition from the biometric data in the evaluation unit 53.

The storage device storing the correspondence information may be a server provided outside the vehicle 2. The recording unit 54 can transmit the correspondence information to the server via the communication network such as the Internet according to the related art. Alternatively or additionally, the storage device may be the first memory 41 of the mobile terminal 4 and/or the second memory 61 of the support device 5.

The setting unit 55 performs operation setting of the vehicle 2 in cooperation with the support device 5, for example. In the present embodiment, particularly, when the interactive response unit 51 does not receive the response input from the driver P in the interaction operation, the setting unit 55 instructs the support device 5 of the vehicle 2 to prohibit the vehicle 2 from moving. Thus, when it can be determined that the driver P has no response input and there is a possibility that the driver P has a brain disease, the vehicle 2 is prohibited from being moved, and dangerous driving can be prevented beforehand that may occur due to the health condition.

In addition, when the evaluation unit 53 determines that the health condition of the driver P is good, the setting unit 55 instructs the support device 5 to apply a predetermined first setting to the operation setting of the vehicle 2. On the other hand, when the evaluation unit 53 estimates based on the biometric data that the health condition of the driver P is poor and then determines based on the degree of suitability of the response input from the driver P in the interaction operation that the health condition of the driver P is good, the setting unit 55 instructs the support device 5 to apply a predetermined second setting different from the first setting to the operation setting of the vehicle 2.

As described above, the second setting may be, for example, a safety setting with more safety considerations than the first setting.

When the biometric data is not good but the response input is normal, since it is considered that the driver P is in a state of fatigue or lack of sleep, appropriate support for safe driving can be provided to the driver P by switching the operation setting of the vehicle 2.

Here, specific contents of the first setting and the second setting can be determined in advance in the support device 5 according to vehicle functions provided in the vehicle 2. As described above, according to the present embodiment, as an example, the support device 5 sets the inter-vehicle distance in the front vehicle follow-up traveling executed by the vehicle control device 6 provided in the vehicle 2 to be longer in the second setting rather than the first setting. Further, the support device 5 sets the start condition of the automatic braking executed by the vehicle control device 6 provided in the vehicle 2 to be decelerated earlier in the second setting rather than the first setting.

When the evaluation unit 53 estimates based on the biometric data that the health condition of the driver P is poor and then determines based on the degree of suitability of the response input from the driver P in the interaction operation that the health condition of the driver P is also poor, the setting unit 55 instructs the support device 5 to apply the second setting to the operation setting of the vehicle 2 or, to prohibit the vehicle 2 from moving.

Figure 4:
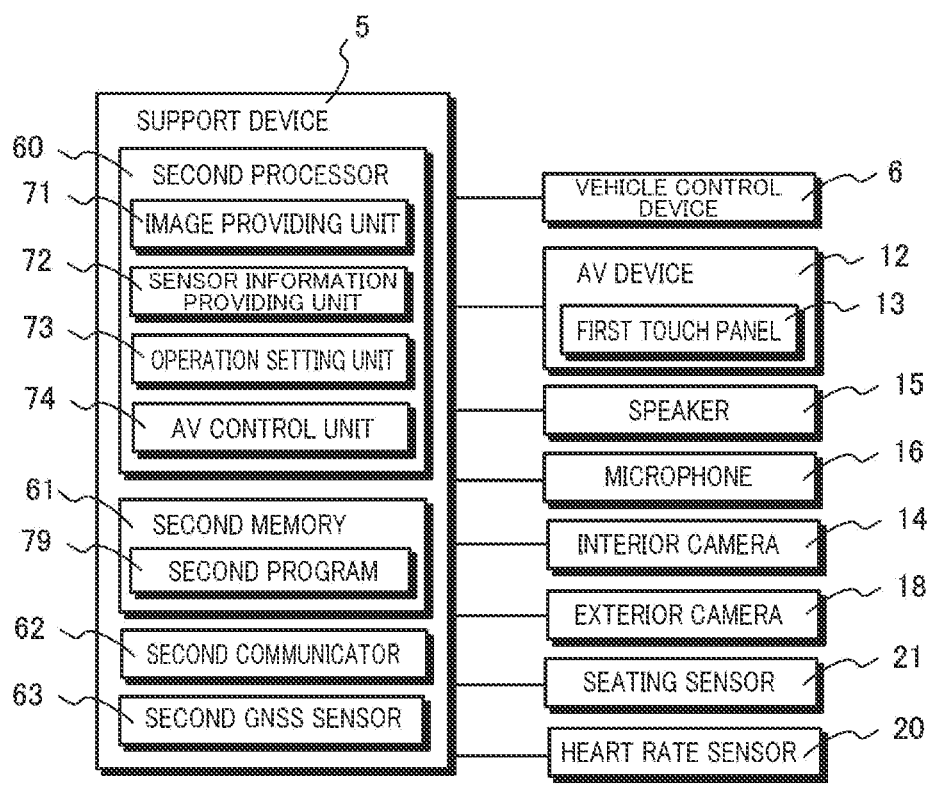
FIG. 4 is a diagram showing a configuration of the support device constituting the driver support system.

FIG. 4 is a diagram showing a configuration of the support device 5 provided in the vehicle 2.

The support device 5 includes a second processor 60, a second memory 61, a second communicator 62, and a second GNSS sensor 63.

The second memory 61 may be configured by volatile and/or non-volatile semiconductor memory. The second communicator 62 is a transceiver (transmitter/receiver, circuit) through which the support device 5 communicates with the mobile terminal 4 and another in-vehicle device such as the vehicle control device 6 of the vehicle 2. For example, the second communicator 62 can include a short-range communicator for performing short-range communication conforming to a Bluetooth communication standard with the mobile terminal 4, and a transceiver for performing communication with various in-vehicle electronic control devices including the vehicle control device 6 for performing operation control and operation monitoring of the vehicle 2 via an in-vehicle network.

The second processor 60 is a computer including a CPU, for example. The second processor 60 may include a ROM in which a program is written, a RAM for temporarily storing data, and the like. The second processor 60 includes an image providing unit 71, a sensor information providing unit 72, an operation setting unit 73, and an AV control unit 74, as functional components or functional units.

These functional components of the second processor 60 are implemented when the second processor 60 serving as a computer executes a second program 79 stored in the second memory 61. The second program 79 can be stored in any computer-readable storage medium. Alternatively, all or some of the functional components of the second processor 60 may be configured by hardware including one or more electronic circuit components. As described above, the second program 79 constitutes the driver support program in the present disclosure together with the first program 59 executed by the mobile terminal 4.

Upon receiving a request received from the mobile terminal 4, the image providing unit 71 transmits an image of the interior of the vehicle 2 captured by the interior camera 14 and/or an image of the surroundings of the vehicle 2 captured by the exterior camera 18, to the mobile terminal 4.

Upon receiving a request received from the mobile terminal 4, the sensor information providing unit 72 transmits, to the mobile terminal 4, information about the fact that the person is seated in the driver's seat 10 and the heart rate of the person who touches the heart rate sensor 20, based on sensor signals from the seating sensor 21 and heart rate sensor 20.

The operation setting unit 73 performs the operation setting of the vehicle 2. The operation setting unit 73 instructs the vehicle control device 6 provided in the vehicle 2 to prohibit the vehicle 2 from moving (that is, to prohibit the vehicle 2 from traveling) according to an instruction from the mobile terminal 4. Further, the operation setting unit 73 applies the predetermined first setting or second setting to the operating setting of the vehicle control device 6 provided in the vehicle 2 according to an instruction from the mobile terminal 4.

As described above, the second setting may be a safety setting with more safety considerations than the first setting. In the present embodiment, the inter-vehicle distance in the front vehicle follow-up traveling executed by the vehicle control device 6 is set to be longer in the second setting rather than the first setting. Alternatively or additionally, the start condition of the automatic braking executed by the vehicle control device 6 is set to be decelerated earlier in the second setting rather than the first setting.

The AV control unit 74 causes the AV device 12 to output image information and voice information through the first touch panel 13 and the speaker 15. In addition, the AV control unit 74 receives and processes the operation input from the first touch panel 13 and the voice input from the microphone 16. In the present embodiment, particularly, the AV control unit 74 causes the AV device 12 to execute the interaction operation by the first touch panel 13, the speaker 15, and/or the microphone 16, which are the HMI devices, according to the instruction of the interactive response unit 51 received from the mobile terminal 4.

Figure 5:
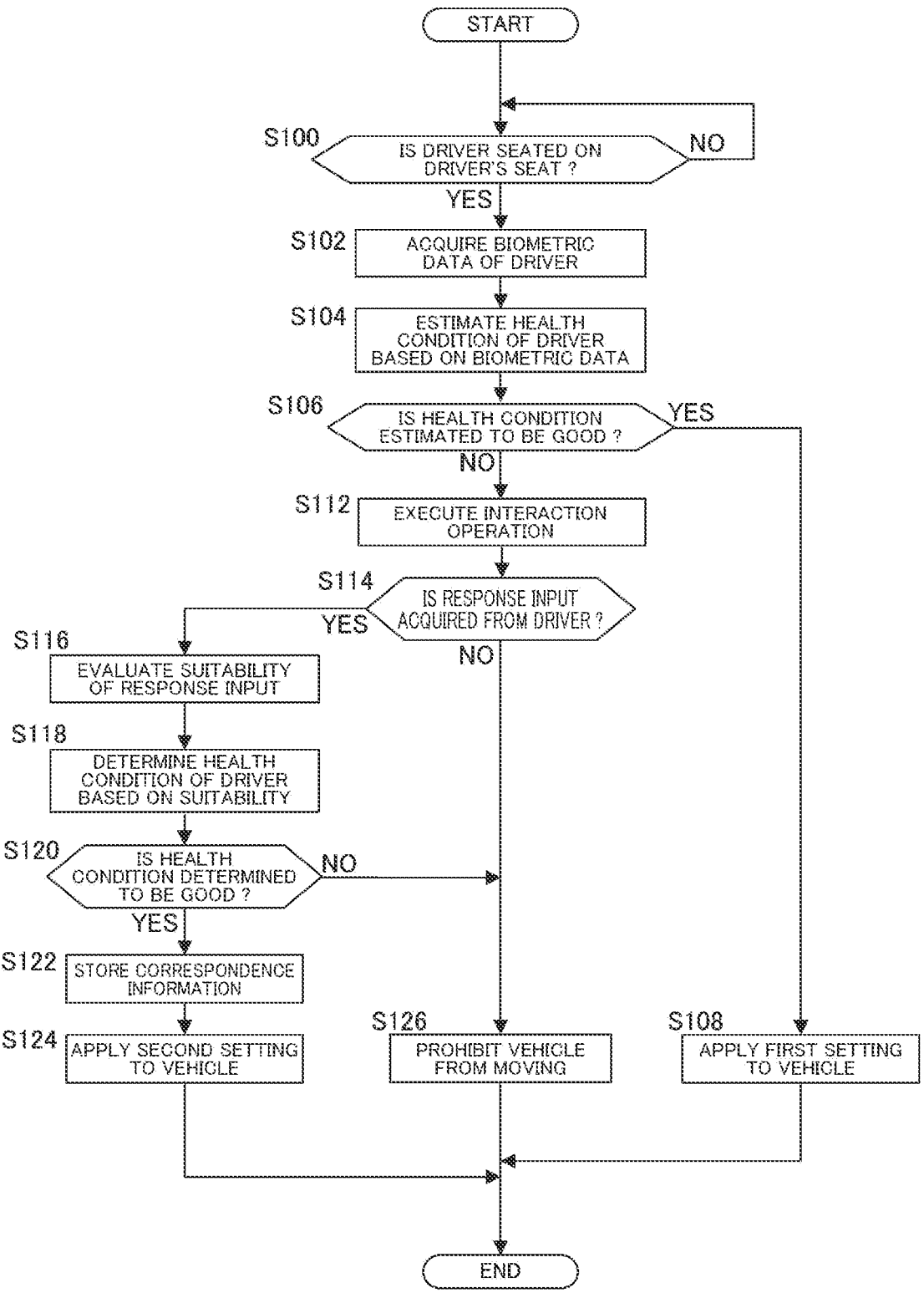
FIG. 5 is a flowchart showing a procedure of processing of a driver support method executed by the driver support system.

Next, a procedure of the operation in the driver support system 1 will be described. FIG. 5 is a flowchart showing a procedure of processing of a driver support method executed by the driver support system 1. The processing in FIG. 5 is repeatedly executed.

When the processing starts, first, the arrival detection unit 50 of the mobile terminal 4 constituting the driver support system 1 determines whether the driver P carrying the mobile terminal 4 is seated on the driver's seat 10 of the vehicle 2 (S100). Then, when the target person P is not seated on the driver's seat 10 (S100, NO), the process returns to step S100, and the arrival detection unit 50 repeats the process and waits for the driver P to sit on the driver's seat 10.

On the other hand, when the driver P is seated on the driver's seat (S100, YES), the acquisition unit 52 52 acquires biometric data of the driver P from, for example, the wearable terminal 3 (S102), and the evaluation unit 53 estimates the health condition of the driver P based on the biometric data (S104). As the result of the estimation, the evaluation unit 53 determines whether the health condition of the driver P can be estimated to be good (S106).

Then, when evaluation unit 53 estimates that the health condition of the driver is good (S106, YES), the setting unit 55 instructs the support device 5 to apply the first setting to the operation setting of the vehicle 2 in the vehicle control device 6 (S108), and this processing ends. Here, the first setting is a default setting of the vehicle 2, and can be applied in advance to the vehicle control device 6 when the power switch of the vehicle 2 is turned on. In this case, the setting unit 55 confirms in step S108 that the first setting is applied to the vehicle control device 6, and maintains the applying of the first setting.

On the other hand, when it is estimated in step S106 that the health condition of the driver is poor (S106, NO), the evaluation unit 53 instructs the interactive response unit 51 to execute the interaction operation (S112). The interactive response unit 51 determines whether the response input from the driver P to the response facilitating output can be acquired (S114). For example, the interactive response unit 51 determines whether all of the response inputs from the driver P to the series of response facilitating outputs can be acquired. As described above, when there is no response input from the driver P, the interactive response unit 51 repeats the corresponding response facilitating output at predetermined time intervals. When there is no response input from the driver P for a predetermined number of times, the interactive response unit 51 finally determines that the response input from the driver P cannot be acquired.

Then, when the response input from the driver cannot be acquired (S114, NO), the setting unit 55 instructs the support device 5 to cause the vehicle control device 6 to prohibit the vehicle 2 from moving (S126), and this processing ends.

On the other hand, the response input from the driver P is acquired in step S114 (S114, YES), the evaluation unit 53 evaluates the degree of suitability of the response input from the driver P to the response facilitating output in the interaction operation (S116), and the evaluation unit 53 determines the health condition of the driver P based on the degree of suitability (S118). The evaluation unit 53 determines whether the health condition of the driver P can be determined to be good (S120), the setting unit 55 instructs the support device 5 to cause the vehicle control device 6 to prohibit the vehicle 2 from moving (S114) when it cannot be determined to be good (S120, NO), and this processing ends.

On the other hand, when the evaluation unit 53 determines in step S120 that the health condition of the driver P is good (S120, YES), the recording unit 54 causes the storage device to store the correspondence information in which the biometric data used for estimating the health condition in step S104 is associated with the determination result of "good" in step S120 (S122). The storage device may be the server outside of the vehicle 2, the first memory 41 of the mobile terminal 4 and/or the second memory 61 of the support device 5.

Subsequently, the setting unit 55 instructs the support device 5 to apply the second setting different from the first setting to the operation setting of the vehicle 2 in the vehicle control device 6 (S124), and this processing ends. As described above, the second setting may be a safety setting with more safety considerations than the first setting.

In the above, step S102 corresponds to the acquisition step in the present disclosure. Further, steps S104, S116, and S118 correspond to evaluation steps in the present disclosure. In addition, step S112 corresponds to an interactive response step in the present disclosure.

[Other Embodiments]

The vehicle 2 is shown as an example of a moving object in the above-described embodiment, but the moving object into which the driver P gets is not limited to the vehicle, and may be any moving object including ships and aircraft.

In the above-described embodiment, when the driver P is seated on the driver's seat, the operations are performed for estimating the health condition based on the biometric data, determining the health condition based on the interaction operation, and applying the operation setting to the vehicle control device 6, but these operations may be performed without being limited to the timing when the driver P is seated on the driver's seat 10. These operations may be executed when the vehicle 2 stops moving. For example, in the flowchart shown in FIG. 5, instead of determining in step S100 whether the driver P is seated on the driver's seat 10, the acquisition unit 52 and the evaluation unit 53 determine whether the vehicle 2 is stopped, and subsequent steps can be executed when the vehicle is stopped.

In the flowchart shown in FIG. 5, when the response input from the driver P cannot be acquired in the interaction operation (NO in step S114) or the health condition of the driver P cannot be determined to be good from the degree of suitability of the response input (NO in step S120), the vehicle 2 is prohibited from moving in step S126 as an example, but the process in step S126 is not limited thereto.

The process in step S126 may be any process of supporting the driver P who is presumed not to be good in health condition. In step S126, for example, instead of or in addition to prohibiting the vehicle 2 from moving, the mobile terminal 4 constituting the driver support system 1 may notify information indicating that the health condition of the driver P is not good, together with information about the current position of the driver P, to a support service operated by a medical institution or a private company, or a person (for example, a family of the driver P) registered in the mobile terminal in advance.

Some of the functional components of the mobile terminal 4 of the present embodiment may be distributed to other devices such as the support device 5 communicably connected to the mobile terminal 4. For example, the interactive response unit 51, the acquisition unit 52, the evaluation unit 53, the recording unit 54, and/or the setting unit 55 provided in the mobile terminal 4 shown in FIG. 3 may be provided in the support device 5.

Alternatively, the driver support system 1 includes an additional server, which is communicably connected to the mobile terminal 4 and the support device 5, for information processing, and the interactive response unit 51, the acquisition unit 52, the evaluation unit 53, the recording unit 54, and/or the setting unit 55 may be implemented in a computer of the additional server. Alternatively, the interactive response unit 51, the acquisition unit 52, the evaluation unit 53, the recording unit 54, and/or the setting unit 55 may be implemented by being distributed to the mobile terminal 4, the support device 5, and the additional server. In such a case, all of the first program 59 executed by the mobile terminal 4, the second program 79 executed by the support device 5, and the program executed by the computer of the additional server are equivalent to the driver support program in the present disclosure.

The HMI devices used for the interaction operation performed between the interactive response unit 51 and the driver P are the first touch panel 13, the speaker 15, and the microphone 16 as examples in the above-described embodiment, but are not limited thereto. The HMI devices used for the interaction operation may be any apparatuses, equipment, and/or devices capable of facilitating the driver P to respond and/or acquiring the response from the driver P. Such HMI devices may include not only the first touch panel 13, the speaker 15, and the microphone 16 described above, but also a physical switch (unlike a virtual switch displayed on a touch panel, a switch that moves and operates physically or mechanically by a person's operation), a display device that does not have a touch panel and performs only display, and an image capturing device such as the interior camera 14 for receiving an input operation by a user's gesture.

It should be noted that the present invention is not limited to the configuration of the above-described embodiment, and can be implemented in various forms without departing from the gist of the present invention.

[Configurations Supported by Embodiment Described Above]

The above-described embodiment supports the following configurations.

(Configuration 1) A driver support system including: an acquisition unit that acquires biometric data of a driver of a moving object; an evaluation unit that evaluates a health condition of the driver; and an interactive response unit that executes an interaction operation for interactive response with the driver using an HMI device mounted on the moving object, the evaluation unit being configured to: when estimating based on the biometric data for the driver that the health condition of the driver is poor, instruct the interactive response unit to execute the interaction operation, thereby acquiring a response input, which is a response of the driver to a response facilitating output that facilitates the driver to respond in the interaction operation; and determine the health condition of the driver based on a degree of suitability of the response input to the response facilitating output.

According to the driver support system of Configuration 1, the health condition of the driver of the moving object can be appropriately determined, including a viewpoint of possibility of brain disease, and appropriate support for safe driving can be provided to the driver.

(Configuration 2) In the driver support system according to Configuration 1, the driver support system includes a setting unit that performs an operation setting of the moving object, and the setting unit prohibits the moving object from moving when the interactive response unit does not receive the response input in the interaction operation.

According to the driver support system of Configuration 2, when it can be determined that the driver has no response input and there is a possibility that the driver has a brain disease, the moving object can be prohibited from being moved, and dangerous driving can be prevented beforehand that may occur due to the health condition.

(Configuration 3) In the driver support system according to Configuration 1 or 2, the interactive response unit repeatedly executes the response facilitating output at predetermined time intervals when not receiving the response input to the response facilitating output from the driver.

According to the driver support system of Configuration 3, even when the driver is engrossed by other things and thus not able to input a response, the health condition is not determined to be poor, and the health condition of the driver can be evaluated more appropriately.

(Configuration 4) In the driver support system according to any one of Configurations 1 to 3, the driver support system includes a recording unit that records a result of the health condition of the driver evaluated by the evaluation unit, and when the evaluation unit estimates based on the biometric data that the health condition of the driver is poor and then determines based on the degree of suitability that the health condition of the driver is good, the recording unit causes a storage device to store the biometric data and a result of the determination in association with each other.

According to the driver support system of Configuration 4, it is possible to improve estimation accuracy of the health condition based on the biometric data, using the correspondence information between the biometric data and the determination result stored in the storage device.

(Configuration 5) In the driver support system according to any one of Configurations 1 to 4, the driver support system includes a setting unit that performs an operation setting of the moving object, the setting unit applies a predetermined first setting to the operation setting of the moving object when the evaluation unit determines based on the biometric data that the health condition of the driver is good, and the setting unit applies a predetermined second setting different from the first setting to the operation setting of the moving object when the evaluation unit determines based on the biometric data that the health condition of the driver is poor and then determines based on the degree of suitability that the health condition of the driver is good.

According to the driver support system of Configuration 5, When the biometric data is not good but the response input is normal, since it is considered that the driver is in a state of fatigue or lack of sleep, appropriate support for safe driving can be provided to the driver by switching the operation setting of the moving object.

(Configuration 6) In the driver support system according to any one of Configurations 1 to 5, the response facilitating output facilitates the driver to respond in voice, the response input being a voice response from the driver to the response facilitating output, the interactive response unit executes the interaction operation using an open-ended question as the response facilitating output, and the evaluation unit performs an evaluation on the presence or absence of a symptom of speech disorder or delirium in the driver or a degree of the symptom, based on a voice response, which is the response input in the interaction operation, and determines the health condition of the driver based on a result of the evaluation.

According to the driver support system of Configuration 6, the prediction or the sign of the brain disease is sensed by conversation with the driver using the open-ended question, and thus the health condition of the driver can be evaluated more appropriately.

(Configuration 7) In the driver support system according to any one of Configurations 1 to 5, the response facilitating output is output to the driver through a speaker and/or a display device mounted on the moving object, and the response input is received through a microphone and/or a touch panel mounted on the moving object.

According to the driver support system of Configuration 7, the interactive response with the driver is performed by various HMI devices, and thus the health condition of the driver can be determined.

(Configuration 8) A driver support method executed by a computer, the driver support method including: an acquisition step of acquiring biometric data of a driver of a moving object; an evaluation step of evaluating a health condition of the driver; and an interactive response step of executing an interaction operation for interactive response with the driver in the moving object, the evaluation step including: when estimating based on the biometric data for the driver that the health condition of the driver is poor, causing the interactive response step to be executed, thereby executing the interaction operation using an HMI device mounted on the moving object, and acquiring a response input, which is a response of the driver to a response facilitating output that facilitates the driver to respond in the interaction operation; and determining the health condition of the driver based on a degree of suitability of the response input to the response facilitating output.

According to the driver support method of Configuration 8, the health condition of the driver of the moving object can be appropriately determined, including a viewpoint of possibility of brain disease, and appropriate support for safe driving can be provided to the driver.

(Configuration 9) A non-transitory computer readable storage medium storing a driver support program causing a computer of a driver support system to function as: an acquisition unit that acquires biometric data of a driver of a moving object; an evaluation unit that evaluates a health condition of the driver; and an interactive response unit that executes an interaction operation for interactive response with the driver in the moving object, the evaluation unit being configured to: when estimating based on the biometric data for the driver that the health condition of the driver is poor, instruct the interactive response unit to execute the interaction operation using an HMI device mounted on the moving object, thereby acquiring a response input, which is a response of the driver to a response facilitating output that facilitates the driver to respond in the interaction operation; and determine the health condition of the driver based on a degree of suitability of the response input to the response facilitating output.

According to the driver support program of Configuration 9, it is possible to realize the driver support system in which the health condition of the driver of the moving object can be appropriately determined, including a viewpoint of possibility of brain disease, and appropriate support for safe driving can be provided to the driver.

REFERENCE SIGNS LIST 1 driver support system
2 vehicle
3 wearable terminal
4 mobile terminal
5 support device
6 vehicle control device
10 driver's seat
11 instrument panel
12 AV device
13 first touch panel
14 interior camera
15 speaker
16 microphone
17 door mirror
18 exterior camera
19 steering wheel
20 heart rate sensor
21 seating sensor
40 first processor
41 first memory
42 first communicator
43 second touch panel
44 first GNSS sensor
45 acceleration sensor
50 seating detection unit
51 interactive response unit
52 acquisition unit
53 evaluation unit
54 recording unit
55 setting unit
59 first program
60 second processor
61 second memory
62 second communicator
63 second GNSS sensor
70 communication control unit
71 image providing unit
72 sensor information providing unit
73 operation setting unit
74 AV control unit
79 second program.

What is claimed is:

1. A driver support system comprising a processor, wherein
the processor:
acquires biometric data of a driver of a moving object;
evaluates a health condition of the driver based on the biometric data of the driver;
when estimating based on the biometric data for the driver that the health condition of the driver is good, applies a predetermined first setting to at least one of a setting of an inter-vehicle distance with a front vehicle traveling in front of the moving object and a setting of a start condition of an automatic braking; and
when estimating based on the biometric data for the driver that the health condition of the driver is poor,
executes an interaction operation for interactive response with the driver using an HMI (Human Machine Interface) device mounted on the moving object, thereby acquiring a response input, which is a response of the driver to a response facilitating output that facilitates the driver to respond in the interaction operation;
determines the health condition of the driver based on a degree of suitability of the response input to the response facilitating output; and
when determining based on the degree of suitability that the health condition of the driver is good after estimating based on the biometric data that the health condition of the driver is poor, applies a predetermined second setting, which is different from the first setting, to the at least one of the setting of the inter-vehicle distance with the front vehicle traveling in front of the moving object and the start condition of the automatic braking.

2. The driver support system according to claim 1, wherein
the processor prohibits the moving object from moving when the response input in the interaction operation is not received.

3. The driver support system according to claim 1, wherein
the processor repeatedly executes the response facilitating output at predetermined time intervals when not receiving the response input to the response facilitating output from the driver.

4. The driver support system according to claim 1, wherein
that the processor records a result of the health condition of the driver evaluated in a memory, and
when estimating based on the biometric data that the health condition of the driver is poor and then determining based on the degree of suitability that the health condition of the driver is good, stores, in the memory, the biometric data and a result of the determination in association with each other.

5. The driver support system according to claim 1, wherein the second setting is at least one of a setting in which the inter-vehicle distance in the front vehicle follow-up traveling is longer in the second setting rather than the first setting and the start condition of the automatic braking to be decelerated earlier in the second setting rather than the first setting.

6. The driver support system according to claim 1, wherein
the response facilitating output facilitates the driver to respond in voice, the response input being a voice response from the driver to the response facilitating output,
the processor executes the interaction operation using an open-ended question as the response facilitating output, and performs an evaluation on the presence or absence of a symptom of speech disorder or delirium in the driver or a degree of the symptom, based on a voice response, which is the response input in the interaction operation, and determines the health condition of the driver based on a result of the evaluation.

7. The driver support system according to claim 1, wherein
the response facilitating output is output to the driver through a speaker and/or a display device mounted on the moving object, and
the response input is received through a microphone and/or a touch panel mounted on the moving object.

8. A driver support method executed by a computer, the driver support method comprising:
acquiring biometric data of a driver of a moving object;
evaluating a health condition of the driver based on the biometric data of the driver;
when estimating based on the biometric data for the driver that the health condition of the driver is good, applying a predetermined first setting to at least one of a setting of an inter-vehicle distance with a front vehicle traveling in front of the moving object and a start condition of an automatic braking; and
when estimating based on the biometric data for the driver that the health condition of the driver is poor,
executing an interaction operation for interactive response using an HMI (Human Machine Interface) device mounted on the moving object, and acquiring a response input, which is a response of the driver to a response facilitating output that facilitates the driver to respond in the interaction operation;
determining the health condition of the driver based on a degree of suitability of the response input to the response facilitating output; and
when determining based on the degree of suitability that the health condition of the driver is good after estimating based on the biometric data that the health condition of the driver is poor, applying a predetermined second setting, which is different from the first setting, to the at least one of the setting of the inter-vehicle distance with the front vehicle traveling in front of the moving object and the start condition of the automatic braking.

9. A non-transitory computer readable storage medium storing a driver support program causing a computer of a driver support system to:
acquire biometric data of a driver of a moving object;
evaluate a health condition of the driver based on the biometric data of the driver;
when estimating based on the biometric data for the driver that the health condition of the driver is good, apply a predetermined first setting to at least one of a setting of an inter-vehicle distance with a front vehicle traveling in front of the moving object and a start condition of an automatic braking; and
when estimating based on the biometric data for the driver that the health condition of the driver is poor,
an interaction operation for interactive response with the driver using an HMI (Human Machine Interface) device mounted on the moving object, thereby acquiring a response input, which is a response of the driver to a response facilitating output that facilitates the driver to respond in the interaction operation;
determine the health condition of the driver based on a degree of suitability of the response input to the response facilitating output; and
when determining based on the degree of suitability that the health condition of the driver is good after estimating based on the biometric data that the health condition of the driver is poor, apply a predetermined second setting, which is different from the first setting, to the at least one of the setting of the inter-vehicle distance with the front vehicle traveling in front of the moving object and the start condition of the automatic braking.

* * * * *